United States Patent [19]

Meininger et al.

[11] 4,088,441

[45] May 9, 1978

[54] DYESTUFF COMPOSITION FOR THE DYEING OR PRINTING OF CELLULOSE FIBER MATERIALS

[75] Inventors: Fritz Meininger, Frankfurt am Main; Walter Noll, Bad Soden, Taunus; Arno Spange, Eschborn, Taunus, all of Germany

[73] Assignee: Hoechst Aktiengesellschaft, Frankfurt am Main, Germany

[21] Appl. No.: 713,589

[22] Filed: Aug. 11, 1976

Related U.S. Application Data

[63] Continuation-in-part of Ser. No. 558,906, Mar. 17, 1975, abandoned.

[30] Foreign Application Priority Data

Mar. 18, 1974 Germany .............................. 2412964

[51] Int. Cl.$^2$ .............................................. D06P 1/38
[52] U.S. Cl. ......................................... 8/1 P; 8/39 R; 8/82; 8/89 R
[58] Field of Search ............ 8/39 R, 39 C, 1 E, 21 C, 8/89 P, 173

[56] References Cited

U.S. PATENT DOCUMENTS

| | | | |
|---|---|---|---|
| 3,617,168 | 11/1971 | Mack | 8/163 |
| 3,632,294 | 1/1972 | Hoelyle et al. | 8/1 P |
| 3,767,356 | 10/1973 | Turner | 8/21 C |

OTHER PUBLICATIONS

Chem. Abstracts, vol. 79, 1973, p. 56, Abstract No. 93343 and p. 29.
Keaton et al, S. Soc. Dyers & Col., Jun. 1964, pp. 312–322.

*Primary Examiner*—Donald Levy
*Attorney, Agent, or Firm*—Curtis, Morris & Safford

[57] ABSTRACT

A dyestuff composition for the dyeing or printing of natural or regenerated cellulose fiber materials, consisting of 20 to 70 percent by weight of C.I. Reactive Blue 19 (sodium salt), anthraquinone-2-sulfonic acid (sodium salt), a condensation product of naphthalene-sulfonic acid with formaldehyde (sodium salt), a condensed phosphate (sodium salt), preferably sodiumhexametaphosphate or penta-sodiumtriphosphate, and a dust preventing agent.

6 Claims, No Drawings

DYESTUFF COMPOSITION FOR THE DYEING OR PRINTING OF CELLULOSE FIBER MATERIALS

This application is a continuation-in-part of copending application Ser. No. 558,906 filed Mar. 17, 1975, now abandoned.

The present invention relates to a dyestuff composition which is very readily soluble in water and in alkaline dyeing liquors and is suitable for the dyeing or printing of natural or regnerated cellulose fiber materials. This composition consists of 20 to 70 percent by weight, preferably 30 to 65 percent by weight, of C.I. Reactive Blue 19 (sodium salt), anthraquinone-2-sulfonic acid (sodium salt), a condensation product of naphthalene-sulfonic acid with formaldehyde (sodium salt), a condensed phosphate (sodium salt), preferably sodiumhexametaphosphate or penta-sodiumtriphosphate, and a dust-preventing agent.

A dust-preventing agent, a mineral oil emulsion may be used.

The dyestuff composition may further contain urea, moreover water-soluble compounds which have almost no or only little influence on the solubility of the dyestuff as non ionic extenders, such as dextrin or cane sugar. It may also contain alkali metal halides or sulfates, for example sodium chloride or sodium sulfate, which may originate from the manufacturing process of the dyestuff and which do not adversely affect the properties of the dyestuff composition, if present in only small amounts.

A dyestuff composition of the invention which contains 30 to 65 percent by weight of C.I. Reactive Blue 19 (sodium salt), 4 to 6 percent by weight of anthraquinone-2-sulfonic acid, 14 to 18 percent by weight of a condensation product of naphthalenesulfonic acid and formaldehyde, 1 to 5 percent by weight of a condensed phosphate (sodium salt), preferably sodiumhexametaphosphate or penta-sodiumtriphosphate, and 1 to 5 percent by weight of a dust-preventing agent, for example a mineral oil emulsion, is especially advantageous.

Compared with compositions which do not contain the abovecited organic non-dyeing aids, the composition of the invention has a substantially better solubility in water or in aqueous-alkaline dyeing liquors, alkaline padding liquors and printing pastes and is excellently suitable for the reactive dyeing or printing of natural or regenerated cellulose fiber materials, for example cotton, linen or spun rayon and which level brilliant blue dyeings and prints free from dots can be produced even in deep shades. Especially for the dyeing from aqueous-akaline padding liquors, for example according to methods which are essential for the dyeing with reactive dyes, such as the one-bath pad-batch process, the one-bath pad-dry process and the pad short-dwell process, a good solubility in water is a compulsory condition, since the relatively small volume of the padding liquor has to hold, in addition to the acid-binding agents, such as for example sodium carbonate and trisodium phosphate, and electrolyte additives, major amounts of dyestuff, namely up to 100 parts of dyestuff in 1,000 parts of a padding liquor.

It has to be considered a surprise that the dyestuff composition of the invention, used according to the above cited padding processes, produces entirely even and deep dyeings on cellulose fiber materials, since the dyestuff as obtained by the manufacturing process, even in the presence of hitherto usual organic aids, is extremely difficult to be dissolved when dyeing from aqueous-alkaline padding liquors, and dyeing which are level in deep shades are not obtained at all.

The organic aids to be used according to the invention may be added in any manner known. The dyestuff and the aids may be mixed in a drum and/or ground in the conventional dry-material crushing devices, for example pinned disk mills or ball mills, to give a fine powder. The aids may also be added directly to the moist filter cake of the organic dyestuff, obtained in usual manner, or optionally upon dilution with water, and this mixture may be converted by drying, preferably by spray-drying, into the commercially available dyestuff powder.

The following Examples illustrate the invention, the parts and percentages being by weight unless stated otherwise.

EXAMPLE 1

75 Parts of C.I. Reactive Blue 19 (sodium salt) having a pure dyestuff content of 67 percent were ground in a pinned disk mill with 3 parts of urea, 3 parts of sodiumhexametaphosphate (sodium salt) and 16 parts of a condensation product of naphthalene-sulfonic acid and formaldehyde (sodium salt).

a. 10 Parts of the dyestuff composition obtained were dissolved by pouring hot water over it. The dyestuff solution was diluted with an adequate amount of cold water to 1,000 parts by volume and 10 parts by volume of a 32.5% sodium hydroxide solution and 30 parts of anhydrous sodium sulfate were added at 20° C. A cotton fabric was treated in the usual manner at 20° C with this padding liquor which had to contain a solution of all the ingredients. Upon the padding operation, the dyed material was batched up and enveloped all over in a plastic sheeting. After a dwelling period of 5 hours, the dyeing was finished by rinsing it with cold and hot water, soaping at the boil and again rinsing it with coldwater. A light blue dyeing was obtained.

b. When 90 parts of the above dyestuff composition were used instead of 10 parts and 26 parts by volume of a 32.5% sodium hydroxide instead of 10 parts by volume thereof, the dyeing obtained was entirely useless and full of specks.

c. To test the stability of an alkaline padding liquor, 40 parts of the above dyestuff composition, instead of 10 parts, and 16 parts by volume of the 32.5% sodium hydroxide solution, instead of 10 parts by volume, were added. The padding liquor obtained was unstable at 20° C. After a dwelling time of 5 to 10 minutes, a major part of the dyestuff used had precipitated from the alkaline padding liquor.

This Example demonstrates that the dyestuff composition prepared with the usual dispersing aids does not meet the requirements of practice.

If the same composition is applied according to sections a, b, and c, with the only difference that it contains 3 parts of penta-sodiumtriphosphate instead of sodiumhexametaphosphate, the identical results are obtained.

EXAMPLE 2

75 Parts of C.I. Reactive Blue 19 (sodium salt) having a pure dyestuff content of 67 percent were ground in a pinned disk mill with 5 parts of anthraquinone-2-sulfonic acid (sodium salt), 17 parts of sodium sulfate and 3 parts of a mineral oil emulsion.

a. 10 parts of the dyestuff composition obtained were used to prepare an alkaline padding-liquor as in Example 1a and to dye a cotton fabric in the manner indicated there. A light blue dyeing was obtained.

b. When, instead of 10 parts of the above-cited dyestuff composition, 90 parts thereof were used, and instead of 10 parts by volume, 26 parts by volume of a 32.5% sodium hydroxide solution were added, an entirely useless, uneven dyeing full of specks was obtained.

c. To test the stability of an alkaline padding liquor, 40 parts of the above-mentioned dyestuff composition were dissolved at 20° C according to Example 1 with the addition of 16 parts by volume of a 32.5% sodium hydroxide solution. The stability of the alkaline padding liquor was unsatisfactory. After a dwelling time of 5 minutes, the dyestuff used was still entirely in solution but after 25 to 30 minutes a major part thereof had precipitated from the padding liquor.

The Example demonstrates that a dyestuff composition containing anthraquinone-2-sulfonic acid (sodium salt) as an additive but no dispersing aids is not suitable for preparing stable alkaline padding liquors and for producing deep cotton dyeings.

EXAMPLE 3

75 Parts of C.I. Reactive Blue 19 (sodium salt) having a pure dyestuff content of 67 percent were ground in a pinned disk mill with 5 parts of anthraquinone-2-sulfonic acid (sodium salt), 3 parts of urea, 3 parts of sodiumhexametaphsophate, 11 parts of a condensation product of naphthalene-sulfonic acid and formaldehyde (sodium salt) and 3 parts of a mineral oil emulsion. The dyestuff composition obtained had a very good solubility in water which was determined at 20° C to be higher than 80 g/l, at 40° C 170 g/l and at 90° C 250 g/l.

A dyestuff composition having similar good properties as disclosed hereinafter was obtained using, instead of 5 parts of anthraquinone-2-sulfonic acid (sodium salt), only 4 or 10 parts thereof, instead of 11 parts of the condensation product of naphthalene-sulfonic acid and formaldehyde (sodium salt), 12 respectively 6 parts thereof, and instead of 3 parts of sodiumhexametaphosphate, 3 parts of penta-sodiumtriphosphate.

This dyestuff composition could also be prepared by mixing the moist dyestuff filter cake with water and the necessary aids and drying the mixture, for example by spray-drying.

a. 10 Parts of this dyestuff composition were used to treat a cotton fabric according to Example 1a. A level light blue dyeing was obtained.

b. 90 Parts of the novel dyestuff composition and 26 parts by volume of a 32.5% sodium hydroxide solution were required to produce a deep brilliant blue dyeing with a satisfactory levelness on the cotton fabric according to the dyeing process disclosed in Example 1a.

c. To test the stability of an alkaline padding liquor, 100 parts of the dyestuff composition were dissolved at 20° C according to Example 1 with the addition of 28 parts by volume of a 32.5% sodium hydroxide solution. After a dwelling time of up to 30 minutes, the dyestuff used was still entirely in solution. The padding liquor obtained was stable.

The new dyestuff composition is very well and without limitation suitable especially for the pad short-dwell process, the one-bath wet-steam process and the pad-batch process in a dyestuff concentration of up to 100 g/l.

We claim:

1. A dyestuff composition for the dyeing or printing of natural or regenerated cellulose fiber materials, consisting of 20 to 70 percent by weight of C.I. Reactive Blue 19 sodium salt, anthraquinone-2-sulfonic acid sodium salt, a sodium salt of the condensation product of naphthalene sulfonic acid with formaldehyde, a condensed phosphate sodium salt selected from the group consisting of sodiumhexametaphosphate and penta-sodiumtriphosphate, and a dust-preventing agent.

2. A dyestuff composition as claimed in claim 1, wherein the dust-preventing agent is a mineral oil emulsion.

3. A dyestuff composition as claimed in claim 1, which additionally contains urea, dextrin or cane sugar.

4. A dyestuff composition as claimed in claim 1, which has been obtained by mixing or grinding the ingredients.

5. A dyestuff composition as claimed in claim 1, wherein the ingredients have been mixed water and the mixture has been subsequently dried.

6. A dyestuff composition as claimed in claim 1, which contains, as additives, 5 percent by weight of anthraquinone-2-sulfonic acid sodium salt, 3 percent by weight of a condensed phosphate sodium salt selected from the group consisting of sodiumhexametaphosphate and penta-sodiumtriphosphate, 3 percent by weight of a mineral oil emulsion, 3 percent by weight of urea, the balance being a sodium salt of the condensation product of naphthalene sulfonic acid with formaldehyde.

* * * * *